Oct. 3, 1950 W. G. HARDING 2,524,662
CORRUGATED TUBE
Filed Oct. 3, 1944 2 Sheets-Sheet 1

INVENTOR.
WATSON G. HARDING
BY Lester G. Bradley
ATTORNEY

Oct. 3, 1950 — W. G. HARDING — 2,524,662
CORRUGATED TUBE
Filed Oct. 3, 1944 — 2 Sheets-Sheet 2
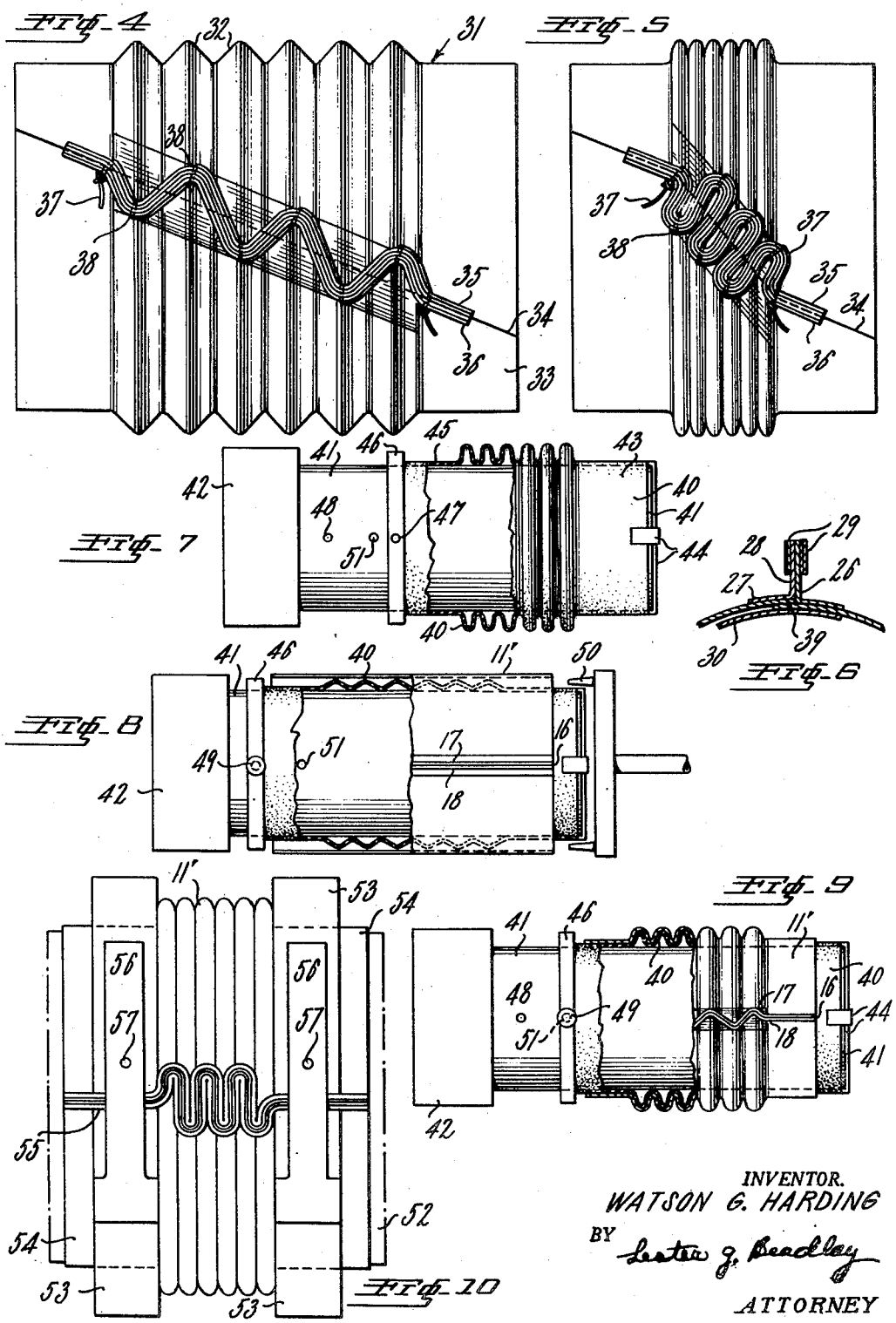
INVENTOR.
WATSON G. HARDING
BY Lester J. Beadley
ATTORNEY Patented Oct. 3, 1950

2,524,662

UNITED STATES PATENT OFFICE 2,524,662

CORRUGATED TUBE

Watson G. Harding, Ridgewood, N. J., assignor to United States Rubber Company, New York, N. Y., a corporation of New Jersey Application October 3, 1944, Serial No. 557,029

9 Claims. (Cl. 138—49)

This invention relates to an improved circumferentially corrugated tube and to the method of making the same. The invention particularly relates to such tubes provided with a longitudinally separable wall, and means for securing said wall together.

The tubes embodying this invention are longitudinally collapsible and extensible and their walls are flexible. Such tubes are useful in forming an enclosure between two moving parts and for protecting any mechanism that may be interposed between such parts. As an example in the application of the tube to an aircraft landing gear, one end of the tube is connected to the cylindrical housing which carries the retractible landing wheels and the other end of the tube is connected to a cylindrical part which supports the wheel and toward which the wheel is adapted to move. In such cases the tube acts to protect the mechanism interposed between the moving parts from dust and dirt, and is normally known as a dust protecting boot.

Heretofore, longitudinally collapsible and extensible corrugated tubes or boots having non-separable walls have been used for the purpose of protecting landing gear mechanisms. The boot was installed at the time the mechanism was assembled, because it was not possible to slip the boot over the mechanism in its assembled position. At times it is necessary to inspect or repair the landing gear mechanism, and in order to do so it is necessary to remove the boot and then replace it. Where the walls of the boot are non-separable the boot cannot be removed and replaced without disassembling the landing gear mechanism, which makes it difficult or impracticable to perform the repair operation in the field. It has been proposed to use a longitudinally slit boot which was cemented together so that the cemented joint could be ripped apart to remove the boot without disassembling the landing gear, but it was not practicable to replace the boot and recement it in the field.

In accordance with this invention the corrugated tube or boot is provided with longitudinally slitted or separable walls which can be opened up and slipped over the mechanism to be protected and then secured together in the field. No special instruments are required, and it is not necessary to disassemble the mechanism. The opening is provided with manually operable mechanical reuseable means for securing the separable walls together. As shown herein, an embodiment of the invention comprises outwardly extending corrugated flexible flanges, secured to the walls of the tube on opposite sides of the line of separation of the walls. The flanges are provided with perforations at the apexes of the turns in the corrugations and are laced together with a cord which passes through the perforations and along the flanges.

The boot is made of a moldable material and preferably of sheet material made from flexible woven fabric treated with a plastic or rubber composition which is adapted to be molded. The material may be made in sheet form and cut into strips with the fabric on the bias. The edges of the strips are lapped and cemented together to form a tube. The tube when so constructed is adapted to be expanded radially and formed into circumferential corrugations by any suitable method, such as described in the U. S. Patent No. 2,272,704. In order to provide more corrugations on the tube per unit of length in its fully collapsed position and give it greater extensibility, the prior method is modified as will be described herein. Prior to corrugating the tube the closure flanges are cemented to the plain tube along each side of the line where the walls of the tube are to be separated, and they are corrugated at the same time the corrugations are formed in the walls of the tube. The moldable plastic fabric is set or cured while the corrugations are collapsed longitudinally. After the tube has been cured and the perforations for the lacings have been formed in the flanges, the tube is separated longitudinally between the outwardly extending flanges.

The corrugated tube embodying this invention has the advantage over the non-separable wall or longitudinally slit and cemented tube in that it can be removed and applied in the field without the use of any special instruments.

This invention will be further described with reference to the accompanying drawings, in which:

Fig. 4 is an elevational view of a modified form of an extended corrugated tube embodying this invention;

Fig. 5 is an elevational view of the tube shown in Fig. 4, but illustrating it in its fully collapsed condition;

Fig. 6 is a fragmentary cross-sectional view of the moldable tube, showing the closure flanges secured thereto prior to corrugating the tube;

Fig. 7 is a view of an apparatus, showing a mandrel partially in section on a supporting rod, which may be used to corrugate the moldable tube;

Fig. 8 is a view of the apparatus shown in Fig. 7 with the moldable tube enclosing the mandrel upon which it is to be corrugated, and showing the mandrel in its longitudinally extended position;

Fig. 9 is a view of the corrugating apparatus showing the moldable tube partially corrugated thereon; and Fig. 10 is an elevational view of the completely collapsed corrugated tube after it has been removed from the corrugating mandrel, shown in Fig. 9, and placed upon another smooth surfaced mandrel for receiving its final set.

Figure 1:
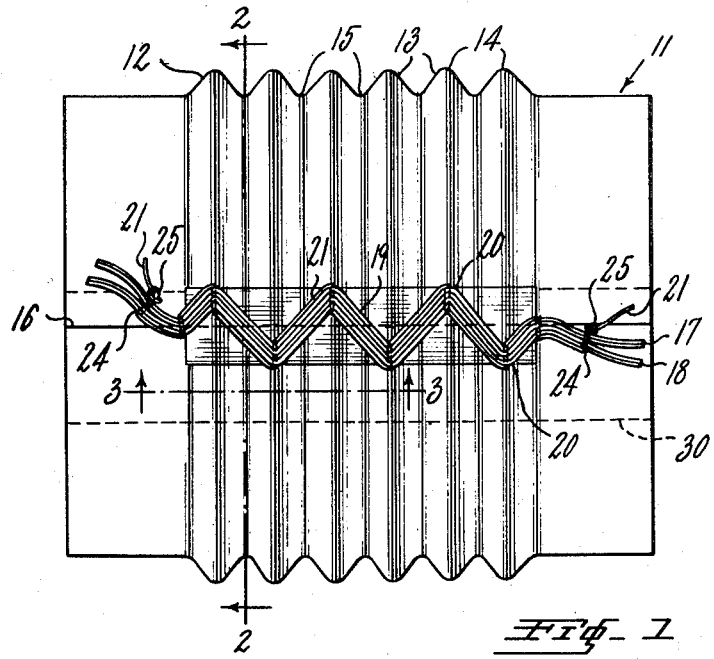
Fig. 1 is an elevational view of a corrugated tube embodying this invention, showing the longitudinally separable walls laced together and extended.

Two forms of the invention are illustrated and described herein. In the form shown in Figs. 1 to 3, the walls of the tube are separated along a line extending substantially parallel to the axis of the tube. In the form of the invention shown in Figs. 4 to 5, the line of separation between the walls of the tube is at an angle to the axis of the tube, or extends spirally thereof. In the second modification, the tube has a greater percentage of axial elongation, as measured from its completely collapsed position, than the first modification. The modification of the tube shown in Figs. 4 and 5 is therefore useful under conditions where it is desired to obtain relatively great extensibility, and where it is required that the tube occupy a relatively small space in its completely collapsed position.

The invention will first be described with reference to the form of the tube shown in Figs. 1 to 3. The tube 11 comprises a flexible wall 12 provided with circumferential corrugations 13, each of which include an inward turn 14 or peak and an outward turn 15 or valley and extends longitudinally of the tube 11 from one peak 14 to an adjacent peak 14, or an equivalent distance. As shown herein, the corrugations extend circumferentially around the tube in a plane substantially perpendicular to the axis. It will be understood, however, that this invention is applicable to longitudinally separable tubes having spirally formed corrugations, and the term circumferential corrugations as used herein includes such corrugations which extend in a circle around the tube or in the form of a spiral. The wall 12 is separable along the longitudinal line 16, so that the tube may be opened up and slipped over an object by passing it through the opening between the longitudinally separated walls. The opening is adapted to be closed by fastening together the outwardly extending flanges 17 and 18 which are secured to the wall 12, on the opposite sides of the line 16. The flanges 17 and 18 are provided with interfitting corrugations 19. Normally one corrugation is formed in the flanges for every two corrugations 13 in the wall 12 of the tube. That is, there is one turn 20 in the flanges 17 and 18 for every two turns (14 and 15) in the wall 12.

The flanges 17 and 18 are preferably fastened together by a cord 21 which extends along the flanges and is laced from side to side of the flanges through perforations 22 formed in the turns 20. The ends of the cord 21 are secured against being pulled out of the end perforations 24 by knots 25 in the ends.

Figure 2:
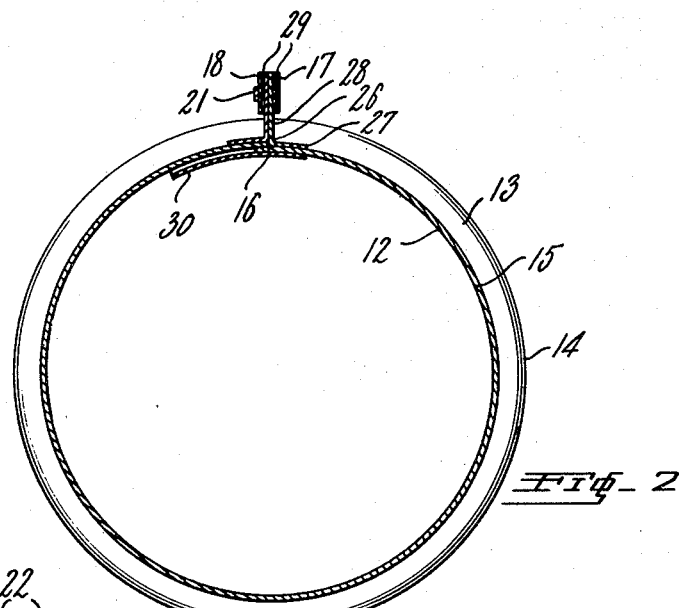
Fig. 2 is a cross-sectional view of the tube shown in Fig. 1 taken on line 2—2.

Referring to Fig. 2, the flanges 17 and 18 are formed from fabric angle strips 26 having one leg 27 secured to the wall 12, preferably by cementing, and the other leg 28 extends outwardly from the wall 12 and forms the securing flanges 17 and 18. The leg 27 is corrugated to the contour of the corrugations 13 and the other leg 28 is provided with a corrugation 19 for each two corrugations 13 in the wall 12. The leg 28 is reinforced by one or more additional plies 29 of fabric at an elevation outside of the greatest diameter of the corrugations 13.

Referring to Fig. 2, a flap 30 is secured to the inside of the wall 12 on one side of the separating line 16 and overlaps the wall 12 at the opposite side of the line so as to form a better seal. The flap 30 is corrugated to the contour of the corrugations 13 in the wall 12 of the tube, and when the opening at the line 16 is secured together, the corrugations in the flap interfit with the corrugations 13 in the wall 12 of the tube.

Figure 3:
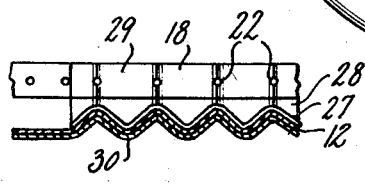
Fig. 3 is a fragmentary cross-sectional view of the tube taken on line 3—3 of Fig. 1, with the lacing cord removed.

The construction of the tube as shown in Figs. 4 and 5 is similar to that of Figs. 1 to 3, the primary differences being that the line of separation in the wall of the tube extends at an angle to the axis of the tube or spirally thereof, so that the closure flanges can be collapsed into a comparatively shorter distance axially of the tube. This is made possible due to the fact that each of the corrugations in the closure flanges are offset radially around the tube from one another. As shown in Fig. 4, the tube 31 is provided with corrugations 32 and the wall 33 is separable along the line 34 which extends at an angle to the axis of the tube or spirally thereof. Flanges 35 and 36 are secured to the wall 33 on each side of the line 34. The flanges are constructed similarly to the flanges described in Figs. 1 to 3, and they are provided with a closure lacing 37 which extends through perforations 38 for holding the flanges together.

Figs. 6 to 10 illustrate the method of manufacturing the tubes shown in Figs. 1 to 5, inclusive. Since the same method is applied in the manufacture of both constructions, the method of manufacture will be described with reference to the construction shown in Figs. 1 to 3, only. The wall 12 and flanges 17 and 18 of the tube 11 are made of a moldable flexible material. The material is preferably made in the form of flat sheets and from a fabric coated and/or impregnated with a moldable plastic composition. A moldable tube 11' is made by cutting the sheet material into strips of the desired width and folding them into the shape of tubes so as to provide a lap joint 39, as shown in Fig. 6. When the sheet material is treated with an unvulcanized rubber composition plastic its surfaces are tacky and will adhere together. In places where it is desired to prevent adhesion, or to eliminate the tacky condition, the surfaces are dusted with soapstone or talc. Preferably the strip forming the flap 30 is cemented to the inside layer of the lap joint 39 before the joint is formed, and when the material is flat. After the joint 39 is formed, the flange forming angle strips 26, having the reinforcing plies 29 secured thereto, are cemented to the smooth wall 12 of the uncorrugated tube along each side of the joint. After the parts have been adhered together the tube is dusted with the soapstone or talc, particularly between the upstanding flanges, to eliminate the tacky condition of the surface.

The moldable tube thus constructed is corrugated on a stretchable corrugated vulcanized rubber composition mandrel 40, which is shown in Fig. 7 in its longitudinally collapsed position on a supporting rod 41 carried by a base 42. The right end 43 of the mandrel fits the free end of the rod tightly and is provided with crossed straps 44 which extend over the end of the rod 41 and prevents the right end of the mandrel from passing over the rod.

The inner end 45 of the mandrel 40 is adapted to be stretched from the position shown in Fig. 7 to the position shown in Fig. 8. For that purpose a reinforcing ring 46 having diametrically opposed holes 47 therein is secured to the mandrel 40. The ring 46 is moved towards the base 42 until the holes 47 match with the hole 48 in the rod 41, and a pin 49 is extended through the holes 47 and the rod 41 to secure the end 45 of the mandrel 40 in the position as shown in Fig. 8.

As shown in Fig. 8, the moldable tube 11' is placed over the stretched mandrel 40, in accordance with the well known practice of expanding the tube by injecting air between the inner walls of the tube 11' and the mandrel 40 from the nozzles 50, which may be rotated around the mandrel to distribute the air. The air is cut off and the tube contracts into close fitting relationship with the mandrel 40. The pin 49 is removed from the end 45 of the mandrel and it contracts longitudinally due to its elastic characteristics. As the contraction takes place, the walls of the tube 11' are caused to be corrugated substantially to the form of the mandrel, and the flanges 17 and 18 are also caused to be corrugated but in a different plane. Normally one corrugation 19 is formed in the flanges 17 and 18 for each two corrugations 13 in the tube. It is desirable that the contraction of the mandrel 40 take place slowly, in order that the operator can guide the corrugations 19 as the flanges are buckled by the contracting mandrel 40. Some manipulation of the flanges 17 and 18 is required in order to assure that the apexes of the turns 20 will fall uniformly on opposite sides of the separating line 16. In order to provide the desired rate of contraction for the mandrel 40, the moving end 45 is caused to slide along the rod 41 with a predetermined frictional resistance, and this can be provided by the tightness of the fit of the mandrel on the rod. Otherwise it may be necessary for the operator, or some other means be provided, to control the rate of contraction.

After the corrugations 13 and 19 have been well formed, the mandrel 40 is additionally collapsed and the end 45 is secured in the position shown in Fig. 9, by extending the pin 49 through the holes 47 and 51 in the mandrel 40 and the rod 41, respectively. The tube 11' is permitted to remain in that position for a short period of time, or otherwise treated until it acquires a sufficient set that it may be removed from the mandrel without mutilating the corrugations. In practice the time allowed for giving the set is about 5 minutes where a certain rubber composition is used as a plastic. It is obvious that the tube may be given other treatments such as by partially vulcanizing the rubber or by partially thermosetting the plastic, which may be substituted for the simple treatment of partially setting the tube by permitting it to remain on the mandrel for a short period.

The tube is removed from the mandrel 40 by elongating the mandrel to the position shown in Fig. 8 and stripping the corrugated tube therefrom. The stripping action may be facilitated by injecting air between the walls of the tube 11' and the mandrel 40 while the tube is being removed. After the tube has been stripped from the mandrel 40, it is placed on a rod 52 (Fig. 10) which approximately fits the inside diameter of the tube. The tube is then compressed in the position shown in Fig. 10 so as to bring the walls of the corrugations closer together, or as shown in contact with one another. Flexible clamping rings 53 are placed around the smooth, or uncorrugated ends 54 of the tube 11' for the purpose of clamping the ends 54 to the rod 52 and holding the tube 11' in the compressed position. The clamping rings 53 may be made of flexible canvas or the like and are split at 55 so that the ring may be open and placed around the tube with the ends of the split positioned on each side of the flanges 17 and 18. Each of the rings is provided with a strap 56 having one end attached to the clamping ring on one side of the split, and having a perforation in the opposite end of the strap which is slipped over a pin 57 which is anchored in the clamping ring 53.

While the tube is held in its compressed position, it is given a permanent set by setting the plastic incorporated in the tube. In the case where a rubber composition is used as a plastic, the tube is given a permanent set by vulcanization. The clamping rings 53 are then removed from the tube 40 and the tube is removed from the rod 52. The perforations 22 are formed in the apexes of the turns 20 of the corrugations 19 in the flanges 17 and 18, as well as the perforations 24 in the ends of the flanges. The walls of the tube are then separated along the joint 39 (Fig. 6) to provide the longitudinally extending opening therein. The separation can be easily effected by stripping the joint apart as it is not strongly bonded together. A weak joint may be produced by providing a very small lap, or by using an anti-adhesive to reduce adhesion. However, should a strong joint be formed, the tube may be separated by cutting it along the lines between the flanges 17 and 18.

The smooth ends 54 are provided on the ends of the tube 11 so that the ends can be conveniently clamped to the relatively moving parts and enclose the space therebetween. In order to make the ends 54 of the tube smooth or without projections, the flanges 17 and 18 are either not adhered to the smooth ends 54, or if so, the flanges are severed at their bases along the lines where they are joined to the tube 11.

While several forms of this invention have been described in detail, it will be understood that further modifications may be made without departing from the spirit of the invention and the scope of the appended claims.

Having thus described my invention what I claim and desire to protect by Letters Patent is:

1. A longitudinally extensible and retractible tube comprising a circumferentially corrugated wall provided with an axially extending slit, an outwardly extending flange attached to said wall on each side of said slit, said flanges being corrugated opposite to the corrugated portion of said tube wall and the corrugations in one flange being adapted to match with the corrugations in the other, and means for attaching and detaching said flanges to and from one another to close and permit the opening of said slit.

2. A longitudinally extensible and retractible tube comprising a circumferentially corrugated wall provided with an axially extending slit, an outwardly extending flange attached to said wall on each side of said slit, said flanges having one corrugation for every two corrugations in the tube wall opposite to the corrugated portion thereof, said corrugations in one flange being adapted to match with the corrugations in the other flange when said flanges are attached to one another, and means for attaching and detaching said flanges to and from one another to close and permit the opening of said slit.

3. A tube comprising a circumferentially corrugated wall provided with an axially extending slit, a flange extending radially from and attached to said wall on each side of said slit, said flanges being corrugated and provided with perforations at the apexes of said corrugations and removable means extending through said perforations to secure said flanges together.

4. A tube comprising a circumferentially corrugated wall provided with an axially extending slit, a flange extending radially from and attached to said wall on each side of said slit, said flanges being corrugated and provided with perforations therein at the apexes of the turns in the corrugations in said flanges, and a lacing extending along said flanges and through said perforations to secure said flanges together and thereby close said slit.

5. A longitudinally extensible and retractible tube comprising a circumferentially corrugated wall provided with a longitudinal slit extending at an angle to the axis of the tube, a corrugated flange attached to said wall on each side of said slit opposite to the corrugated portion of said tube wall, said corrugations in one flange being adapted to match with the corrugations in the other flange when said flanges are attached to one another, and means for attaching and detaching said flanges to and from one another to close and permit the opening of said slit.

6. A tube comprising a circumferentially corrugated wall provided with a spirally extending slit, a radially extending flange attached to said wall and extending along each side of said slit, said flanges having matched corrugations, each of said corrugations in said flanges being radially offset from one another and provided with a perforated apex, and a lacing extending along said flanges and through said perforations to secure said flanges together.

7. A tube comprising a wall having a circumferentially corrugated portion and an end portion having smooth surfaces, said wall having a separable slit extending axially from end to end of said tube, an outwardly extending flange attached to said wall on each side of said slit, said flanges being corrugated with matching corrugations along the corrugated portion of said tube and being straight along the smooth portion of said tube, said flanges having a perforation at the apex of each corrugation, a lacing extending along said flanges and through said perforations, and the ends of said lacing being fastened.

8. A tube comprising a circumferentially corrugated wall provided with an axially extending slit, a sealing flap secured to the inside wall of said tube on one side of said slit and overlapping the wall of said tube on the other side of said slit, said flap being provided with corrugations to match with the corrugations in the wall of said tube, an outwardly extending corrugated flange attached to the outside wall of said tube on each side of said slit, each of said corrugations in said flanges having a perforated apex, and a lacing extending through each of said perforations along said flanges to secure them together.

9. A tube comprising a circumferentially corrugated wall having an axially extending slit therein, radially outwardly extending flanges attached to said wall on each side of said slit, said flanges being made of fabric and reinforced with additional plies of fabric on a diameter greater than the greatest dimension of the outside diameter of the corrugations in the tube walls, said flanges being corrugated and perforated through the reinforced portion at each of the apexes of the corrugations on the flanges, and a lacing extending along said flanges and through said perforations to secure said flanges together.

WATSON G. HARDING.

REFERENCES CITED

The following references are of record in the file of this patent:

UNITED STATES PATENTS

| Number | Name | Date |
|---|---|---|
| 31,614 | Mayall | Mar. 5, 1861 |
| 326,012 | Brooks | Sept. 8, 1885 |
| 433,882 | Belding | Aug. 5, 1890 |
| 927,253 | Lohsand | July 6, 1909 |
| 1,907,307 | Smith | May 2, 1933 |
| 1,971,928 | Zallea | Aug. 28, 1934 |
| 2,286,197 | Claybaugh | June 16, 1942 |
| 2,299,520 | Yant | Oct. 20, 1942 |
| 2,347,101 | Harding | Apr. 13, 1944 |
| 2,350,158 | Evans | May 30, 1944 |

FOREIGN PATENTS

| Number | Country | Date |
|---|---|---|
| 348,500 | Italy | May 20, 1937 |